| 
US007944965B2

(12) United States Patent
Bhaskaran et al.

(10) Patent No.: US 7,944,965 B2
(45) Date of Patent: May 17, 2011

(54) TRANSFORM DOMAIN BASED DISTORTION COST ESTIMATION

(75) Inventors: Vasudev Bhaskaran, Sunnyvale, CA (US); William Chen, Foster City, CA (US); Changick Kim, Yuseong-gu (KR)

(73) Assignee: Seiko Epson Corporation, Tokyo (JP)

( * ) Notice: Subject to any disclaimer, the term of this patent is extended or adjusted under 35 U.S.C. 154(b) by 1548 days.

(21) Appl. No.: 11/305,954

(22) Filed: Dec. 19, 2005

(65) Prior Publication Data

US 2007/0140339 A1 Jun. 21, 2007

(51) Int. Cl.
*H04N 7/12* (2006.01)
*H04B 1/66* (2006.01)

(52) U.S. Cl. ............. 375/240; 375/240.12; 375/240.27; 375/240.21; 375/240.24

(58) Field of Classification Search .................. 375/240, 375/240.12, 240.27, 240.21, 240.24
See application file for complete search history.

(56) References Cited

U.S. PATENT DOCUMENTS

| 5,691,770 | A | 11/1997 | Keesman et al. |
| 2002/0012396 | A1 | 1/2002 | Pau et al. |
| 2003/0156648 | A1* | 8/2003 | Holcomb et al. ........ 375/240.18 |
| 2004/0047418 | A1 | 3/2004 | Tourapis et al. |
| 2004/0131121 | A1 | 7/2004 | Dumitras et al. |
| 2004/0196903 | A1 | 10/2004 | Kottke et al. |
| 2004/0228537 | A1 | 11/2004 | Yeung et al. |
| 2004/0240556 | A1 | 12/2004 | Winger et al. |
| 2004/0258155 | A1 | 12/2004 | Lainema et al. |
| 2005/0013359 | A1 | 1/2005 | Srinivasan |
| 2005/0041740 | A1* | 2/2005 | Sekiguchi et al. ........ 375/240.16 |
| 2005/0201463 | A1* | 9/2005 | Lee et al. ................. 375/240.16 |

OTHER PUBLICATIONS

Sullivan, G., et al., "Video Compression—From Concepts to the H.264/AVC Standard", Proceedings of the *IEEE*, vol. 93, No. 1, Dec. 2004, pp. 18-31.
He, Zhihai, et al., "A Unified Rate-Distortion Analysis Framework for Transform Coding", *IEEE* Transactions on Circuits and Systems for Video Technology, vol. 11, No. 12, Dec. 2001, pp. 1221-1236.
Hyungjoon Kim, et al., "Low-Complexity Macroblock Mode Selection for H.264/AVC Encoders", *IEEE* International Conference on Image Processing, Oct. 2004.

* cited by examiner

*Primary Examiner* — David K Moore
*Assistant Examiner* — Quang N Vo

(57) ABSTRACT

Transform based distortion cost estimation, which may be used to calculate a rate distortion cost associated with a mode for encoding a macroblock, is described. In one embodiment of the invention, a distortion value for a particular mode is estimated within the transform domain, which allows for the elimination of both inverse transformation and inverse motion functions in this calculation. A spatial domain residual of an encoding mode is estimated by identifying a difference, within the transform domain, between a motion compensated prediction residual of a macroblock and its corresponding reconstructed signal. The estimated spatial domain residual may then be used in distortion matrix computations to estimate a distortion level, within the transform domain, for an encoding mode.

13 Claims, 7 Drawing Sheets

Figure 4A (4x4 Luma Block)

(16x16 Luma Block, 8x8 Chroma Block)

Inter Prediction Modes

TRANSFORM DOMAIN BASED DISTORTION COST ESTIMATION

BACKGROUND

A. Technical Field

The present invention relates generally to the encoding of data for transmission along a communications link, and more particularly, to distortion cost estimation within the transform domain for a video encoding mode.

B. Background of the Invention

The burden of high bandwidth applications, such as voice and video, on networks is continually increasing. To facilitate these bandwidth intensive applications, compression technology and standards are evolving to allow these applications to be more effectively communicated across a network to a client. One such standard that relates to the encoding and decoding of video signals is MPEG-4's latest coding standard referred to as MPEG-4/AVC (Advanced Video Coding Standard), which is also commonly referred to by its International Telecommunications Union standard name of H.264. For higher coding efficiencies, MPEG-4/AVC provides tools for variable block size motion compensation prediction for encoding video macroblocks.

Although this standard generally improves the method in which data is encoded, it also increases the demands placed on the processing resources of the encoder itself. Because of the time-sensitive nature of transmitting and receiving video data, an encoder has a limited amount of time to select an appropriate encoding method for a video frame, encode the video frame, and transmit the frame onto a network. The quality of the video signal may be jeopardized if the encoder is unable to complete all of the necessary encoding computations, within the requisite time, that may be needed to encode and transmit the video signal.

FIG. 1 illustrates a typical communications link 120 on which an encoded video signal may be communicated. As illustrated, a video camera 110 generates a video signal, which is sent to an encoder 115. This encoder 115 may be software located on a computer or server that is connected to the communications link 120. The encoder 115 receives a video frame, which is typically divided in macroblocks for encoding purposes. Depending on the content in these macroblocks, they may be further partitioned into smaller blocks to allow more precision in the encoding process.

Each of these macroblocks, and sub-blocks within a macroblock, may be encoded relative to another block located within the same video frame or relative to a block in a previous or future reference frame within the video signal. This encoding is intended to reduce the amount of data redundancy that is transmitted on the communications link 120.

There are typically two types of modes, intra and inter mode, in which a macroblock may be encoded. Intra mode encoding means that encoding occurs relative to blocks within the same video frame. Inter mode encoding means that encoding occurs relative to one or more reference frames outside the current video frame. After a macroblock is encoded, it is transmitted, via the communications link 120, to a receive-side decoder 125. The decoder 125 reconstructs the macroblock within the video signal so that it may be shown in the context of its corresponding frame on the display device 130.

As mentioned above, when either inter or intra mode encoding is performed, a macroblock (e.g., a 16×16 block within a video frame) is encoded relative to a macroblock either in its own frame or in another reference frame. The encoder typically must select a single mode, from a plurality of available modes, in which to encode the particular macroblock.

The selection of a mode often requires that the rate and distortion characteristics of each available mode to be identified. Typically, a rate distortion cost is computed for each available mode so that an appropriate mode may be selected. The computation of rate distortion cost is usually accomplished by performing transformation and quantization calculations on a video macroblock, and then performing inverse transformation and inverse quantization operations so that an error or distortion level may be identified for a particular encoding mode. In the case of variable length encoding schemes, these rate and distortion analyses may require a large number of computations, which may strain the encoder's processing resources and negatively affect the encoder's performance.

SUMMARY OF THE INVENTION

Transform based distortion cost estimation, which may be used to calculate a rate distortion cost associated with a mode for encoding a macroblock, is described. In one embodiment of the invention, a distortion value for a particular mode is calculated within the transform domain, which allows for the elimination of both inverse transformation and inverse motion functions in this calculation. Accordingly, a significant reduction in the number of calculations in distortion estimation is realized. This distortion estimation is used, along with a rate computation, to identify a rate distortion cost for an encoding mode.

In one embodiment of the invention, a spatial domain residual value is estimated by identifying a difference, within the transform domain, between a motion compensated prediction residual and its reconstructed signal that is associated with a mode for encoding a macroblock. This estimated spatial domain residual value is determined in the transform domain without performing inverse transform calculations.

The estimated spatial domain residual may be used further to calculate a rate distortion cost for an encoding mode. In particular, the estimated spatial domain residual is used in distortion matrix computations to estimate a distortion level, within the transform domain, for an encoding mode. The distortion estimation may then be processed with a rate value to identify a rate distortion cost associated with a particular encoding mode.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
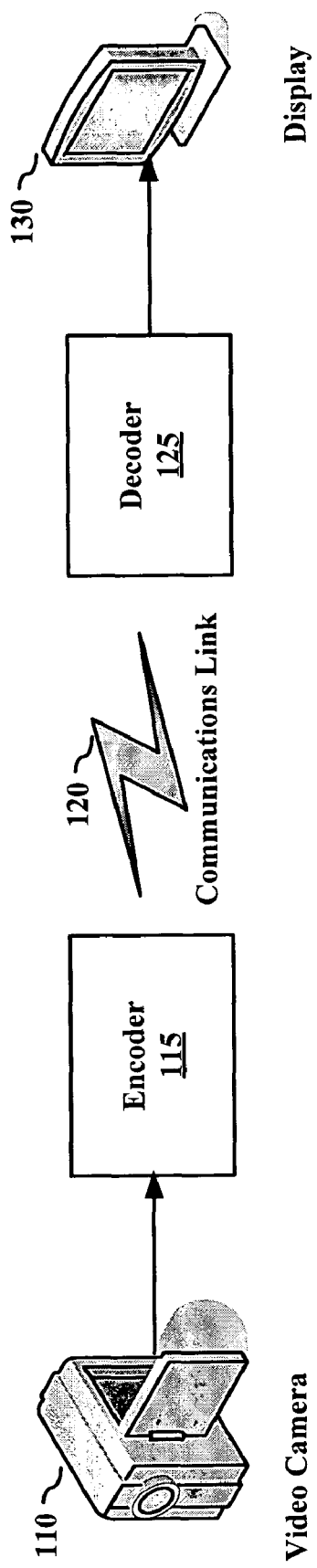
FIG. 1 is an illustration of a communication link on which encoded data may be communicated.

A system, apparatus and method for estimating distortion, within the transform domain, of an encoding mode. In one embodiment of the invention, a distortion value for a particular mode is estimated within the transform domain, which allows for the elimination of both inverse transformation and inverse motion functions in this calculation. In particular, a spatial domain residual of an encoding mode is estimated by identifying a difference, within the transform domain, between a motion compensated prediction residual of a macroblock and its corresponding reconstructed signal. The estimated spatial domain residual may then be used in distortion matrix computations to estimate a distortion level, within the transform domain, for an encoding mode. The distortion estimation may then be processed with a rate value to identify a rate distortion cost associated with a particular encoding mode.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including personal computers and network servers. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

C. Overview

The present invention provides a transform domain based distortion cost estimation associated with an encoding mode for a particular macroblock. In particular, the present invention may reduce the number of calculations performed in determining the RD cost values for each of the available encoding modes so that an appropriate mode may be selected for encoding a particular macroblock.

The selection of an inter or intra mode may significantly depend on the modes' rate distortion ("RD") efficiencies. Depending on the mode that is selected, the macroblock may be partitioned into various sub-blocks. Typically, the complexity and required number of computations for an encoding process increases relative to the number of sub-blocks in which the macroblock is partitioned. Thus, as a macroblock is partitioned into more sub-blocks, the complexity of the mode in which the macroblock is encoded increases and is more able to effectively compensate for larger amounts of distortion.

One calculation that may be used in selecting an appropriate mode is a RD cost computed for each mode. The RD cost value (J) is defined as:

$$J(s,c,m|QP,\lambda_m)=D(s,c,m|QP)+\lambda_m*R(s,c,m|QP),$$

where QP is the macroblock quantization parameter, $\lambda_m$ is the Lagrange multiplier for mode decisions, D is the sum of the squared differences between the original block and a reconstructed block, and R represents the number of bits for coding the mode.

The complexity of the rate distortion computation, and the number of times the computation is performed, directly affects the time and resources required to identify a prediction mode for a macroblock. Depending on the encoder, and the system in which the encoder operates, these computations may overload the encoder resulting in a degradation of the encoding system performance.

D. Encoder

Figure 2:
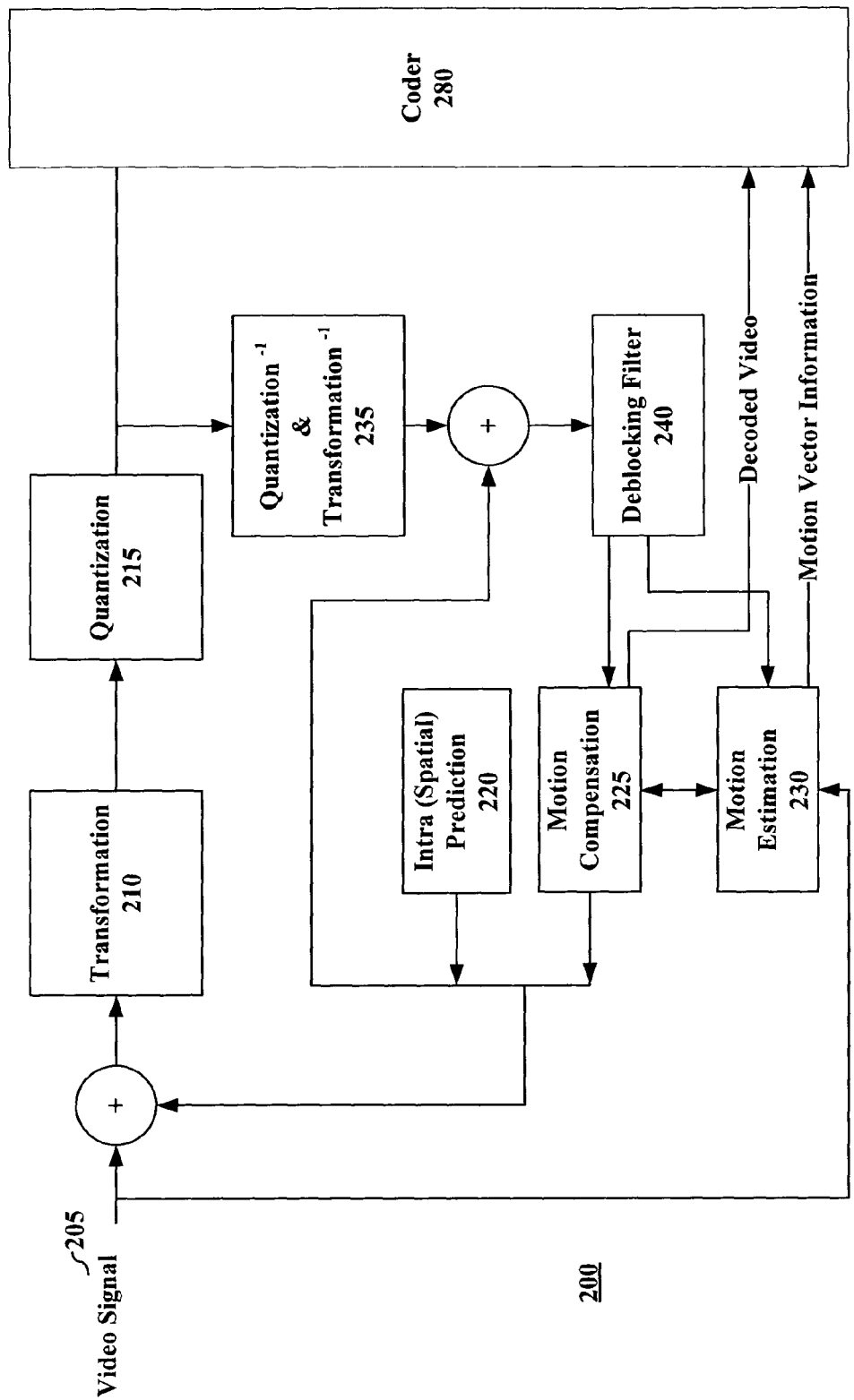
FIG. 2 is a general block diagram of an encoder according to one embodiment of the invention.

FIG. 2 illustrates an encoder 200 that encodes video frame macroblocks using a plurality of available encoding modes. A frame within a video signal 205 is transformed by a transformation module 210 using a direct cosine transformation ('DCT') into a set of spatial frequency coefficients; this DCT is analogous to a transformation from a time domain signal into a frequency domain signal. The frequency coefficients are then quantized by a quantization module 215 which applies a scalar to the frequency coefficients. In effect, the quantization process divides the frequency coefficients by an integer scaling factor resulting in a truncated signal. This process of transforming and quantizing the video frame introduces error, such as lost data, into the video signal.

The encoder 200 also includes a mode selector 250 that identifies a mode or modes in which each macroblock in a frame is encoded. This mode selector 250 includes a reverse quantization and transformation module 235, an intra prediction module 220, a motion compensation module 225, and a deblocking filter 240. The mode selector 250 may interface with or include a motion estimation module 230 and a memory device that stores multiple motion reference frames.

The reverse quantization and transformation module 235 reconstructs a macroblock that had been previously transformed and quantized so that the amount of distortion introduced into the video signal by the encoding processing may be identified. Reconstruction occurs by reverse quantizing a video signal, which results in a rescaled signal. This rescaled signal is then inversely transformed by an inverse discrete cosine transform to produce a reconstructed frame. This reconstructed frame may be compared to the original video frame 205 to identify the distortion or error introduced by the encoding process. Each macroblock within the video signal 205 may be encoded in one of multiple different inter or intra prediction modes, each having associated distortion and rate values.

The intra frame prediction module 220 identifies a potential prediction intra mode for a macroblock. As mentioned above, intra mode encoding uses other blocks within the same video frame to predict a particular block in an intra frame.

The motion estimation module 230 identifies a reference block and a motion vector representative of spatial displacement between the reference block and the block that is to be encoded in an inter mode. The reference block may be located within a single video reference frame or may be generated from multiple blocks within a reference frame or multiple reference frames. The motion vector represents movement of the reference block within a two dimensional grid relative to the position of the block that is to be inter encoded.

The motion compensation module 225 predicts a macroblock from other previously decoded blocks in previous frames that may be used in an inter coding process. This prediction is done by identifying an error or distortion level associated with the reference block and motion vector relative to the particular block that is to be inter encoded. This error is encoded and provided to a receiving client so that the particular block may be reconstructed from the reference block and motion vector data. As described above, each inter mode will have an associated distortion or error value for the particular block. This error value is a significant component in the rate-distortion performance of each of the modes and may be an important consideration in the selection of a single inter encoding mode for the particular block.

The deblocking filter 240 is located within the motion compensation loop and reduces the horizontal and vertical artifacts along the macroblock or sub-blocks edges in order to improve image quality.

Once an encoding mode has been selected (either inter or intra mode), the macroblock is encoded accordingly and transmitted onto a communication link. This encoded data is used to reconstruct the macroblock and display it.

E. Prediction Mode Selection

Figure 3:
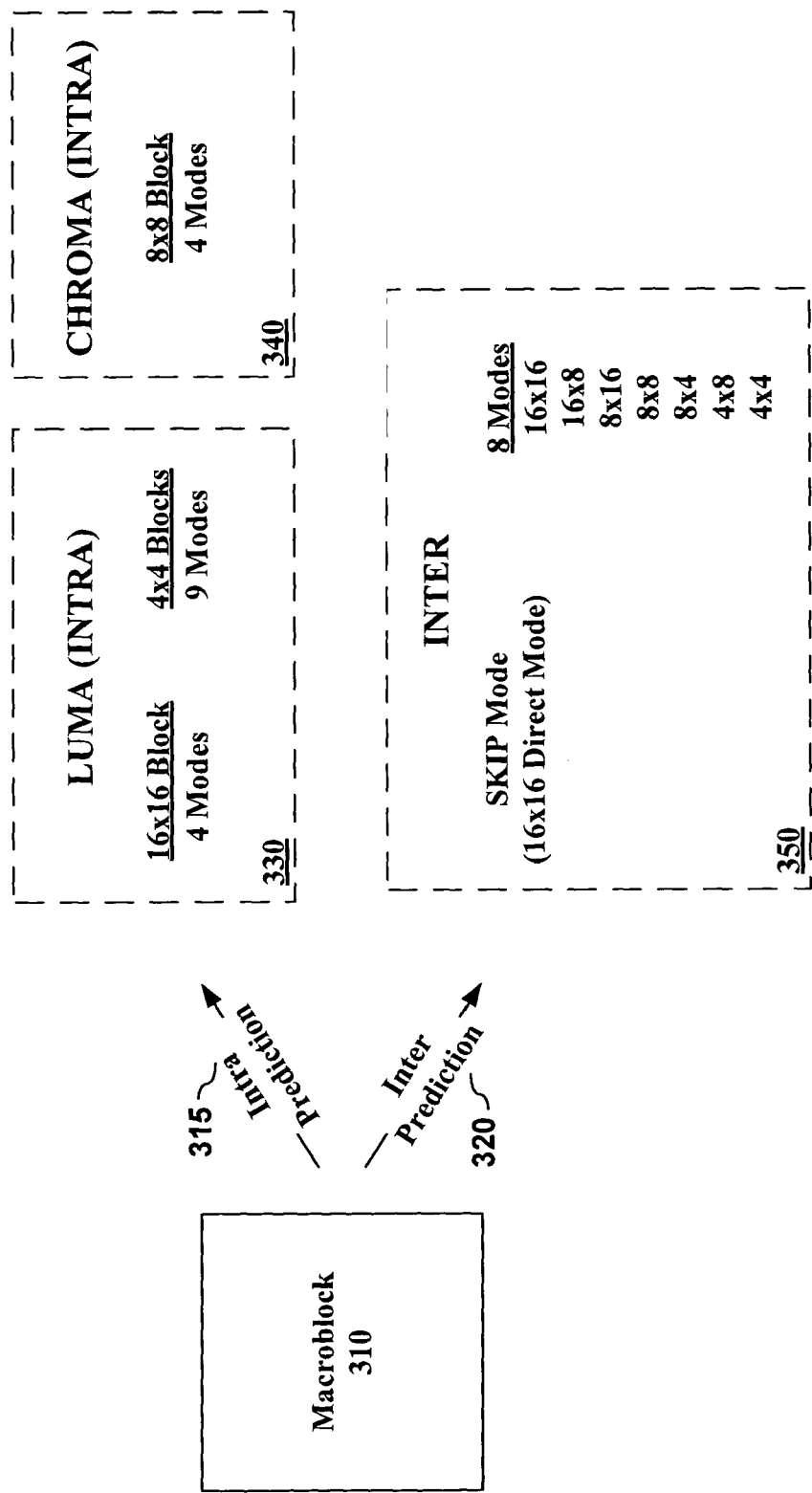
FIG. 3 is an illustration of modes available for inter and intra mode encoding according to one embodiment of the invention.

FIG. 3 illustrates the allowable set of macroblock partitions for encoding modes as defined by the H.264 standard. A macroblock 310 may be encoded using either intra prediction 315 or inter prediction 320. In intra prediction 315, the luma component 330 for each 16×16 block can be predicted in one of four modes using previously decoded pixels from neighboring blocks within the same frame. Also, the luma component 330 may also be predicted by partitioning the 16×16 block into 4×4 sub-blocks and encoding these sub-blocks in one of nine modes using previously decoded pixels from neighboring blocks within the same frame. The chroma component 340 of the macroblock 310 is partitioned into 8×8 sub-blocks and encoded in one of four available modes.

In inter prediction 320, the macroblock 310 may be partitioned into various size sub-blocks and motion compensated prediction is performed on the macroblock 310 or partitioned sub-blocks therein. The macroblock may be partitioned and encoded in one of nine inter modes 350.

a) Prediction Intra Modes (H.264 Standard)

FIG. 4A shows three exemplary prediction mode diagrams for a 4×4 luma video block according to the H.264 standard. This standard defines a total of nine different prediction modes, mode 0 through mode 8, in which a 4×4 luma block may be encoded. Mode 0 405 is a vertical mode in which pixel data is extrapolated from upper samples within the block. Mode 1 410 is a horizontal mode in which pixel data is extrapolated from left samples within the block. Mode 8 415 is a horizontal-up mode in which pixel data is extrapolated from left and lower samples within the block. Modes 2 through 7 are not shown, but detailed description of all 4×4 luma block modes are available in the H.264 standard.

Figure 4B:
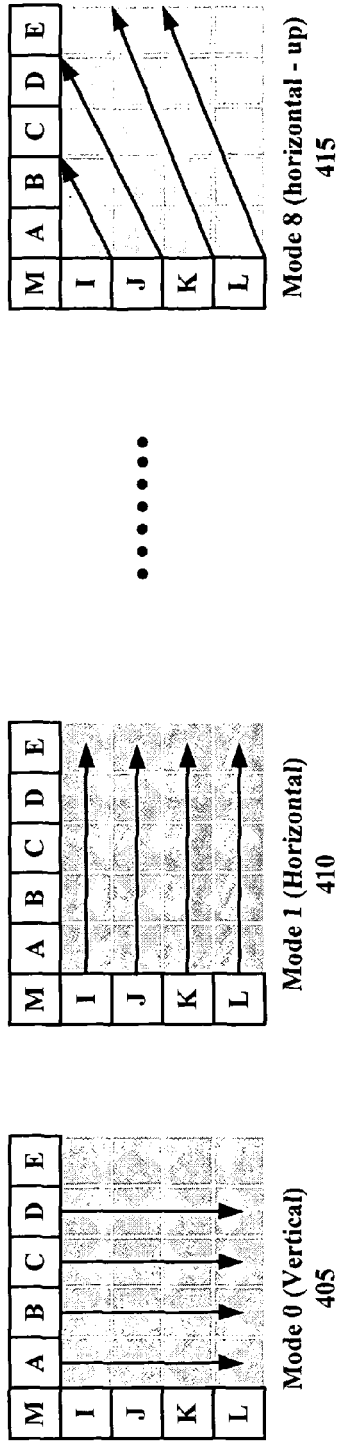
FIG. 4 is a more detailed illustration of modes available for intra mode encoding according to one embodiment of the invention.
Figure 4B:
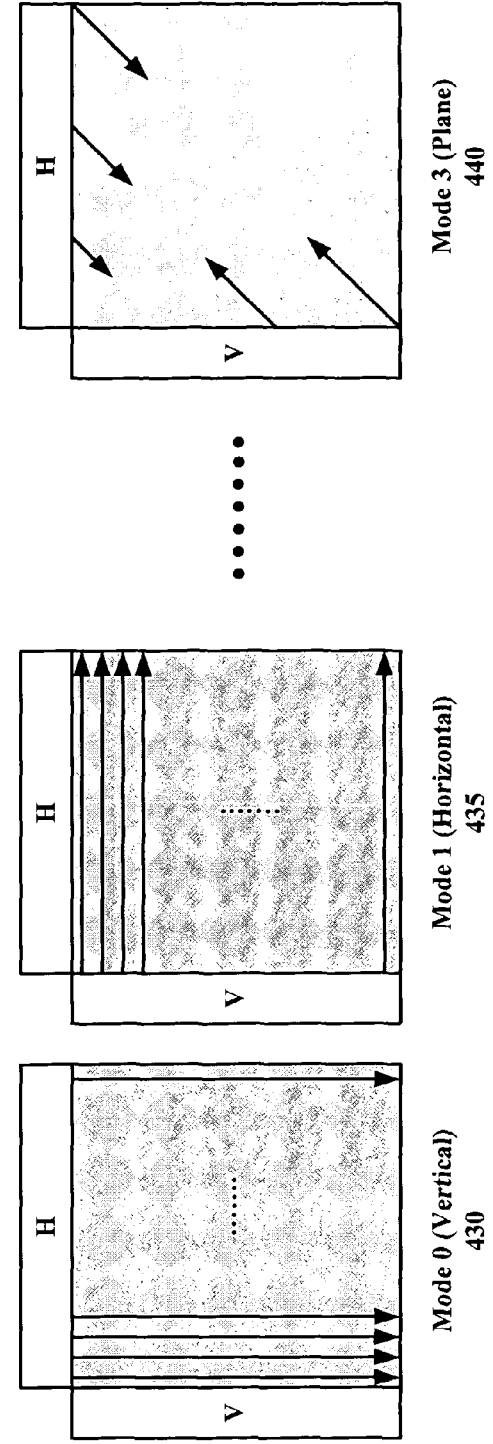

FIG. 4B shows three exemplary mode diagrams for a 16×16 luma video block or 8×8 chroma video block according to the H.264 standard. This standard defines a total of four different prediction modes, mode 0 through mode 3, in which either a 16×16 luma or 8×8 chroma block may be encoded. Mode 0 430 is a vertical mode in which pixel data is extrapolated from upper samples within the block. Mode 1 435 is a horizontal mode in which pixel data is extrapolated from left samples within the block. Mode 3 440 is a "plane" mode in which a linear plane function is fitted to the upper and left-hand samples within the block. Mode 2 is not shown, but detailed descriptions of all 16×16 luma and 8×8 chroma block modes are available in the H.264 standard.

b) Prediction Inter Modes (H.264 Standard)

Figure 5:
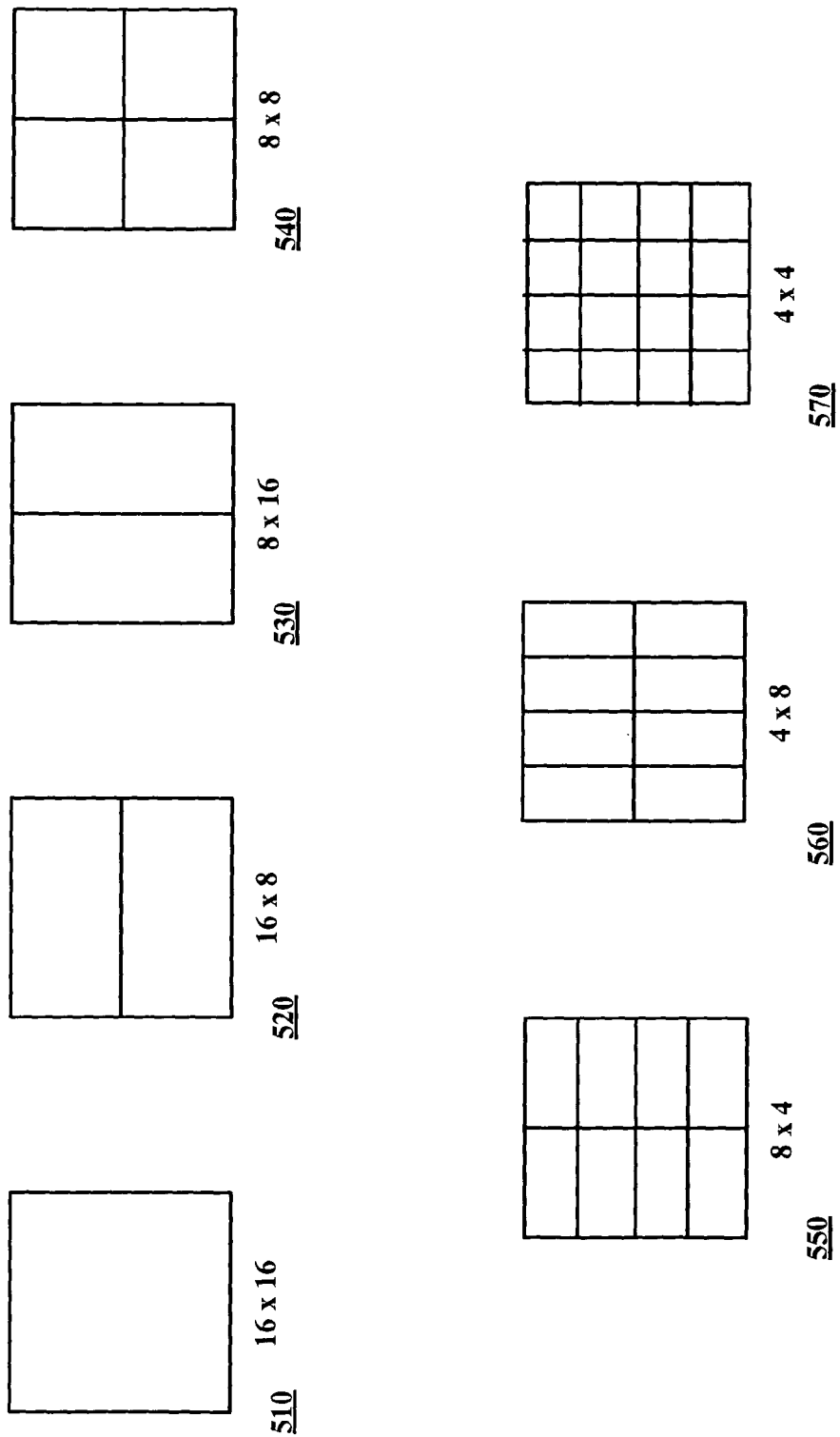
FIG. 5 is a more detailed illustration of modes available for inter mode encoding according to one embodiment of the invention.

FIG. 5 illustrates exemplary prediction inter modes that may be used in accordance with an embodiment of the invention. These modes are defined by the H.264 specification and include seven different inter modes in which a 16×16 macroblock may be partitioned into sub-blocks. A 16×16 mode 510 does not partition a macroblock, rather the entire macroblock is encoded as a single block. A 16×8 mode 520 horizontally divides the macroblock into two 16×8 blocks with each block being individually encoded. An 8×16 mode 530 vertically divides the macroblock into two 8×16 blocks with each block being individually encoded. An 8×8 mode 540 partitions the macroblock into four 8×8 blocks with each block being individually encoded. An 8×4 mode 550 partitions the macroblock into eight 8×4 blocks with each block being individually encoded. A 4×8 mode 560 partitions the macroblock into eight 4×8 blocks with each block being individually encoded. A 4×4 mode 570 partitions the macroblock into sixteen 4×4 blocks with each block being individually encoded.

Generally, the level of complexity and encoding accuracy increases relative to number of blocks in which a macroblock is partitioned and encoded. Thus, if a macroblock contains a significant amount of distortion (i.e., error relative to a reference block) then a mode with more partitioned blocks, such as a 4×4 mode 570, may be used to more accurately communicate the distortion within the macroblock. However, the amount of processor resources and bandwidth requirements that are need for encoding in a 4×4 mode are relatively large compared to the other modes described above. Thus, if there is very little distortion within a macroblock, then a less demanding mode, such as a 16×16 mode 510, may be used in order to preserve resources for encoding other macroblocks.

F. Rate Distortion Optimization

Figure 6:
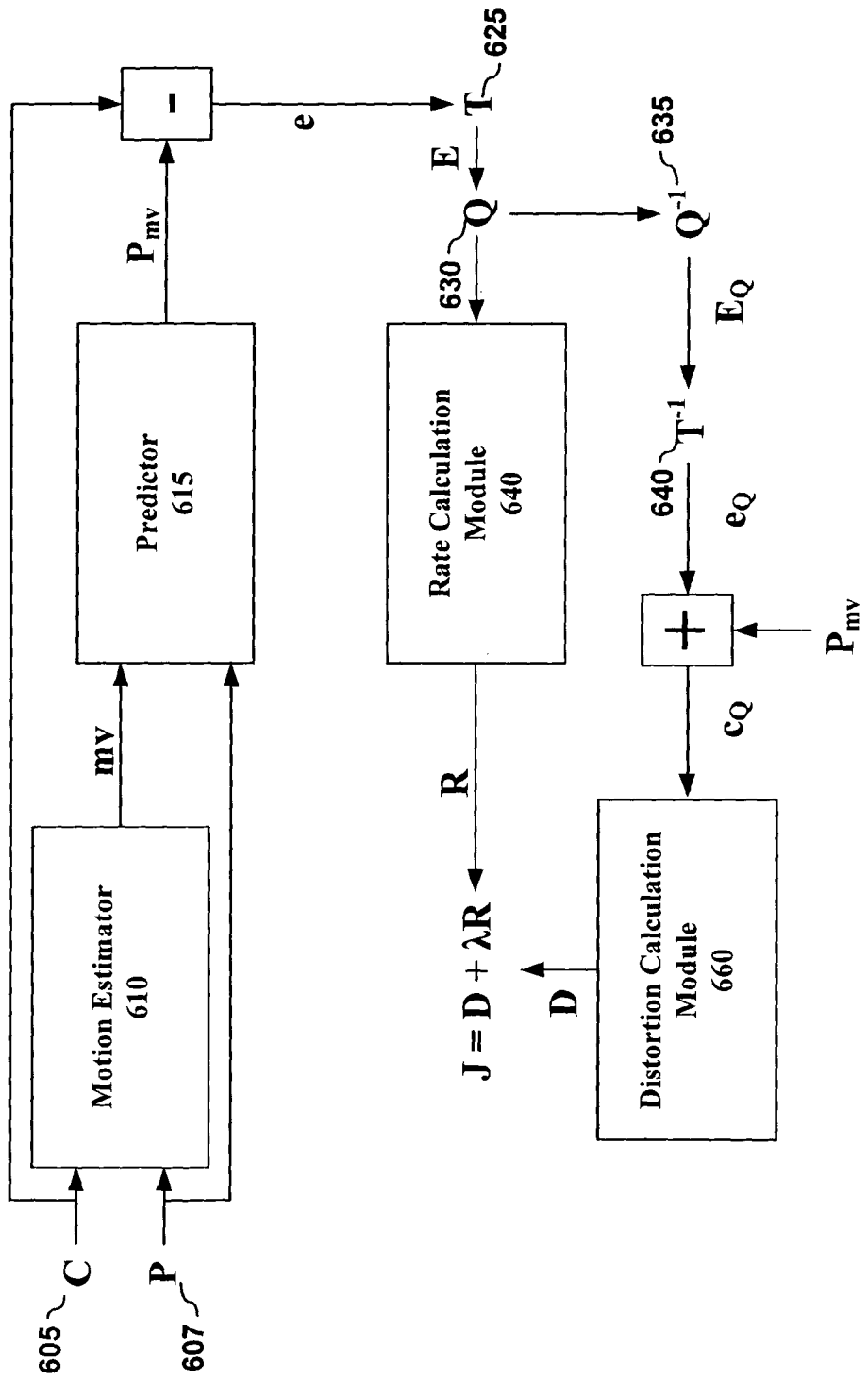
FIG. 6 is a block diagram of H.264 rate distortion calculation framework for a particular inter or intra mode according to one embodiment of the invention.

FIG. 6 is a block diagram of a rate distortion optimization framework for inter prediction modes that is defined by the H.264 standard. A current macroblock (c) 605 in a video frame and pixel information (p) 607 from a different video frame is provided to a motion estimator 610. The motion estimator identifies a motion vector (mv) for the macroblock 605 based on motion estimation operations performed in relation to the macroblock 605 and pixel information 607.

The motion vector and pixel information 607 are provided to a predictor 615 which generates a motion compensated prediction ($p_{mv}$) for the macroblock 605. The macroblock and motion compensated prediction ($p_{mv}$) are compared and a motion compensated prediction residual (e) in the spatial domain is identified. The residual (e) is transformed 625 resulting in a residual (E) in the transform domain, which is quantized 630 and the resulting transformed and quantized residual is provided to a rate calculation module 640.

The transformed and quantized residual is then inversely quantized 635 and inversely transformed 640, which generates a spatial domain reconstructed signal ($e_Q$) corresponding to the motion compensated prediction residual (e). The spatial domain reconstructed signal ($e_Q$) is summed with the motion compensated prediction ($p_{mv}$) to generate the inverse motion compensated reconstructed version ($c_Q$) of the original macroblock (C) 605. The inverse motion compensated reconstructed version ($c_Q$) of the macroblock and the original macroblock (c) 650 is provided to a distortion calculation module 660 that calculates a distortion level associated with the particular mode that is being analyzed. The rate calculation module 640 calculates a rate associated with the particular mode so that an RD cost may be computed for the mode. Each mode that is analyzed may present different rate and distortion tradeoffs.

If intra prediction modes are to be analyzed, a similar procedure is performed with the exception of the motion estimation task and the inverse motion compensation calculations.

a) Transform Domain Based Distortion Cost Estimation

Figure 7:
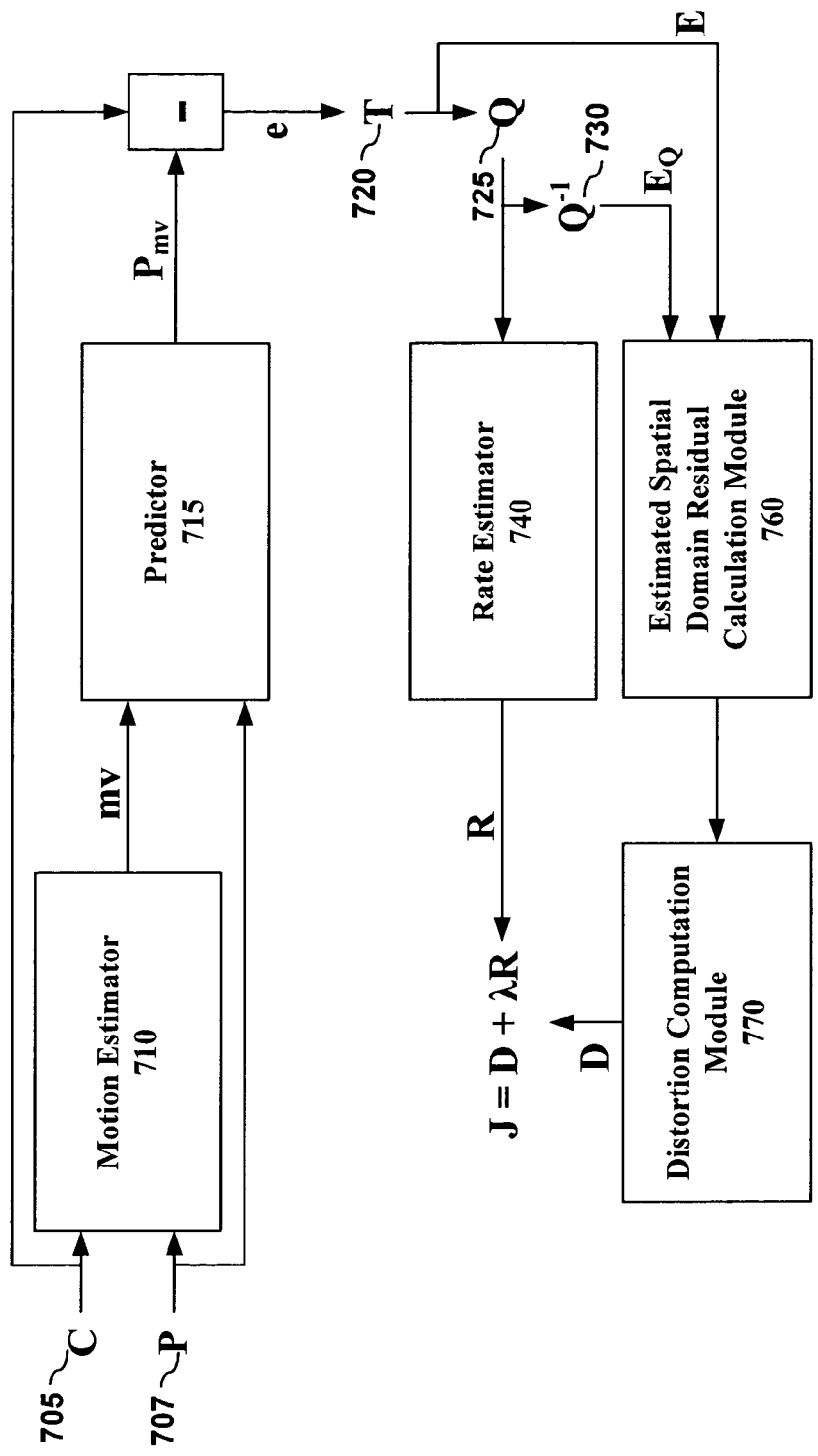
FIG. 7 is a block diagram of transform based rate distortion calculation framework for a particular inter or intra mode according to one embodiment of the invention.

FIG. 7 illustrates a transform domain RD cost framework according to one embodiment of the invention. A motion estimator 710 and a predictor 715 operate similar to those described above in relation to FIG. 6, in which a motion compensated prediction residual (e) in the spatial domain is identified. The residual (e) is transformed 720 resulting in a residual (E) in the transform domain, which is quantized 725 and the resulting transformed and quantized residual is provided to a rate calculation module 740.

The transformed residual (E) is inversely quantized 730 resulting in a reconstructed transform domain residual ($E_Q$) which is provided to an estimated spatial domain residual computation module 760. The transformed residual (E) is also provided to the estimated spatial domain residual computation module 760. The estimated spatial domain residual computation module 760 processes the transform residual (E) and the reconstructed transform domain residual ($E_Q$) in order to generate, within the transform domain, an estimated spatial domain residual, which is the difference of the motion compensated prediction residual and the spatial domain reconstructed signal that is associated with a mode for encoding the original macroblock (c) 705.

According to one embodiment of the invention, the estimated spatial domain residual computation module 760 generates an estimated spatial domain residual, calculated within the transform domain, and provides it to a distortion calculation module 770. This estimated spatial domain residual, generated within the transform domain, can be used to calculate a distortion associated with an encoding mode for the macroblock 705. Accordingly, the inverse transform calculations and the inverse motion computations are skipped during the distortion calculation and RD cost computation procedures.

The RD cost calculation process shows the distortion calculation as:

$D = \|c - c_Q\|$ and may be rewritten as:

$D = \text{trace}((c - c_Q)(c - c_Q)^T)$ wherein the matrices are defined as 4×4 matrices.

It may also be noted that:

$$\text{trace}(A) = \sum_{i=1}^{n} a_{ii} \text{ and } \text{trace}(AA^T) = \sum_{i=j=1}^{n} |a_{ij}|^2$$

As shown in relation to FIG. 6, the macroblock, c, is equal its motion compensated prediction ($p_{mv}$) plus its motion compensated prediction residual (e). Also, the inverse motion compensated reconstructed version ($c_Q$) of the macroblock is equal to the motion compensated prediction ($p_{mv}$), plus spatial domain reconstructed signal ($e_Q$) corresponding to the compensated prediction residual. Accordingly, distortion may be rewritten as:

$D = \text{trace}((e - e_Q)(e - e_Q)^T)$

As this distortion equation indicates, the RD cost calculations relating to the inverse motion compensation computations of FIG. 6 may be eliminated. If distortion is calculated, without inverse transform computations, significant savings in computations is realized in the mode RD cost calculations. Additionally, the motion compensated prediction ($p_{mv}$) need not be fetched during the calculation of the time domain motion compensated reconstructed version of the macroblock.

(i) Spatial Domain Residual Estimation Based in the Transform Domain

The estimated spatial domain residual computation module 760 estimates, within the transform domain, a spatial domain residual associated with a mode for encoding the macroblock 705.

The transformed residual, E, is the transformed output of e such that $E = TeT^{-1}$ where T is the 4×4 integer transform approximate of a 4×4 direct cosine transform ("DCT") as used in the H.264 coding standard and is as shown below:

$$T = \begin{pmatrix} 1 & 1 & 1 & 1 \\ 2 & 1 & -1 & -2 \\ 1 & -1 & -1 & 1 \\ 1 & -2 & 2 & -1 \end{pmatrix}$$

The transformed output (e) may be calculated according to $e = T^{-1}ET$. The reconstructed motion compensation prediction residual $e_Q$ can be written as $$e_Q = \frac{1}{64} T_{inv} E_Q T_{inv}^T,$$

where, $$T_{inv} = \begin{pmatrix} 1 & 1 & 1 & 1/2 \\ 1 & 1/2 & -1 & -1 \\ 1 & -1/2 & -1 & 1 \\ 1 & -1 & 1 & -1/2 \end{pmatrix}$$

From the above equations, it can be shown that $$e - e_Q = T^{-1} E (T^T)^{-1} - \frac{1}{64}(T_{inv} E_Q T_{inv}^T)$$

and this spatial domain residual can also be expressed as $$e - e_Q = \frac{1}{64}\left(T^{-1} \times 64 \times E(T^T)^{-1} - (T_{inv} E_Q T_{inv}^T)\right)$$

wherein $T_{inv} = T^{-1} M_1$, and $M_1 = \text{diag}(4,5,4,5)$. The spatial domain residual may be rewritten as:

$$e - e_Q = \frac{1}{64}\left(T^{-1} \times 64 \times E(T^T)^{-1} - T^{-1} M_1 E_Q M_1 (T^T)^{-1}\right) \text{ or}$$

$$e - e_Q = \frac{1}{64}\left(T^{-1} \times (64 \times E - M_1 E_Q M_1)(T^T)^{-1}\right)$$

which can be rewritten as:

$$e - e_Q = \frac{1}{64}\left(T^{-1}A(T^T)^{-1}\right)$$

where $A = 64 \times E - M_1 E_Q M_1$. Depending on the quantizer values in Q, $E_Q$ will often be sparse and thus, some of the calculations may also be reduced which in turn simplifies the calculations of $a_{ij}$, which will be discussed in detail below.

The spatial domain residual that is still in the transform domain is provided to the distortion calculation module 770.

(ii) Transform Domain Distortion Calculation

According to one embodiment, the distortion calculation module 770 identifies a distortion level, within the transform domain, which is associated with a mode for encoding the macroblock 705. The estimated spatial domain residual, which was calculated in the transform domain, is provided and used to identify this distortion level.

The distortion can be written as:

$$D = \text{trace}\left(\frac{1}{64^2}\left(T^{-1}A(T^T)^{-1}T^{-1}A^T(T^T)^{-1}\right)\right) \text{ or}$$

$$D = \text{trace}\left(\frac{1}{64^2}\left(T^{-1}AM_2A^T(T^T)^{-1}\right)\right)$$

where $$M_2 = (T^T)^{-1}T^{-1} = diag\left(\frac{1}{4}, \frac{1}{10}, \frac{1}{4}, \frac{1}{10}\right),$$

and note that $M_2 T = (T^T)^{-1}$ resulting in the distortion equation being further simplified to:

$$D = \text{trace}\left(\frac{1}{64^2}(T^{-1}AM_2A^TM_2T)\right)$$

According to matrix theory, $TT^{-1} = I$ where I is the identity matrix, then for a matix X, $\text{trace}(T^{-1}XT) = \text{trace}(X)$. Applying this observation, results in yet a further simplification of the distortion calculation:

$$D = \frac{1}{64^2}\text{trace }(AM_2A^TM_2).$$

wherein $AM_2$ is defined as:

$$AM_2 = \begin{matrix} \frac{a_{11}}{4} & \frac{a_{12}}{4} & \frac{a_{13}}{4} & \frac{a_{14}}{4} \\ \frac{a_{21}}{4} & \frac{a_{22}}{10} & \frac{a_{23}}{4} & \frac{a_{24}}{10} \\ \frac{a_{31}}{4} & \frac{a_{32}}{10} & \frac{a_{33}}{4} & \frac{a_{34}}{10} \\ \frac{a_{41}}{4} & \frac{a_{42}}{10} & \frac{a_{43}}{4} & \frac{a_{44}}{10} \end{matrix}$$

and wherein, $a_{ij}$ is the $ij^{th}$ element of the matrix A. Using the property that the trace product of a matrix and its transpose is the sume of squares of the elements of the matrix, the distortion equation can be expressed as:

$$D = \frac{1}{64^2}\begin{bmatrix} \frac{1}{16}[a_{11}^2 + a_{13}^2 + a_{31}^2 + a_{33}^2] + \\ \frac{1}{40}\begin{bmatrix} a_{12}^2 + a_{14}^2 + a_{21}^2 + a_{23}^2 + \\ a_{32}^2 + a_{34}^2 + a_{41}^2 + a_{43}^2 \end{bmatrix} + \\ \frac{1}{100}[a_{22}^2 + a_{24}^2 + a_{42}^2 + a_{44}^2] \end{bmatrix}$$

Thus, the distortion D in the RD cost function may be computed directly in the transform domain since the elements of A are computed from the transform domain matrices E and $E_Q$.

The overall complexity of RD cost calculation is reduced since the inverse transform and inverse motion compensation computations are eliminated within the transform based RD cost computation framework. Although the transform based distortion calculation may be slightly different than distortion calculated in a spatial domain framework, this error is usually negligible and is a result of the arithmetic precision errors caused by the exclusion of the inverse transform and inverse motion compensation steps.

In another embodiment of the present invention, distortion calculated according to $D = \text{trace}((e-e_Q)(e-e_Q)^T)$ may also be implemented, in the spatial domain, if an inner coding loop comprises T, Q, $T^{-1}$, and $Q^{-1}$, which results in a reduction of computations and data accesses that would have been needed for the inverse motion compensation task.

While the present invention has been described with reference to certain exemplary embodiments, those skilled in the art will recognize that various modifications may be provided. Accordingly, the scope of the invention is to be limited only by the following claims.

We claim:

1. A method of estimating a distortion level associated with an encoding mode, the method comprising:
    performing the following steps using an encoder;
    transforming a motion compensated prediction residual associated with the encoding mode;
    quantizing the transformed motion compensated prediction residual;
    inverse quantizing the quantized, transformed motion compensated prediction residual resulting in a reconstructed transform domain residual;
    estimating a spatial domain residual through a transform domain based analysis of the transformed motion compensated prediction residual and the reconstructed transform domain residual; and
    calculating a distortion level from the estimated spatial domain residual;
    wherein the distortion level is defined as the trace $((e-e_Q)(e-e_Q)^T)$, wherein e represents the motion compensated prediction residual, $e_Q$ represents the estimated spatial domain residual, and T represents a 4×4 integer transform approximate of a 4×4 cosine transform, and
    wherein the estimated spatial domain residual is defined as $$e - e_Q = \frac{1}{64}\left(T^{-1}A(T^T)^{-1}\right), \text{ where } A = 64 \times E - M_1 E_Q M_1,$$

wherein E represents the transformed residual, $E_Q$ represents the reconstructed transform domain residual, and $M_1 = \text{diag}(4, 5, 4, 5)$.

2. The method of claim 1, wherein the encoding mode is defined in accordance with the H.264 standard.

3. The method of claim 2, wherein the encoding mode is an intra mode.

4. The method of claim 1, further comprising the step of computing a rate distortion value for the encoding mode using the calculated distortion level.

5. A non-transitory computer readable medium having instructions for performing the method of claim 1.

6. A system for computing a rate distortion cost for an encoding mode, the system comprising:
an encoder comprising at least one of:
a motion estimator, coupled to receive a macroblock and reference pixels, that generates a motion vector for the encoding mode;
a predictor, coupled to receive the reference pixels and the motion vector, that generates motion compensated prediction for the encoding mode;
an estimated spatial domain residual calculation module, coupled to receive a transformed motion compensated prediction residual and a reconstructed transform domain residual, both of which are derived from the macroblock and the motion compensated prediction, wherein the module generates an estimated spatial domain residual in the transform domain; and
a distortion computation module, coupled to receive the estimated spatial domain residual, that generates a distortion value from which a rate distortion cost is generated;
wherein the distortion level is defined as the trace $((e-e_Q)(e-e_Q)^T)$, wherein e represents the motion compensated prediction residual, $e_Q$ represents the estimated spatial domain residual, and T represents a 4×4 integer transform approximate of a 4×4 cosine transform, and
wherein the estimated spatial domain residual is defined as $$e - e_Q = \frac{1}{64}(T^{-1}A(T^T)^{-1}), \text{ where } A = 64 \times E - M_1 E_Q M_1,$$

wherein E represents the transformed residual, $E_Q$ represents the reconstructed transform domain residual, and $M_1$=diag(4,5,4,5).

7. The system of claim 6, further comprising a rate estimator, coupled to receive a transformed and quantized motion compensated residual, that calculates a rate for the encoding mode.

8. The system of claim 6, wherein the encoding mode is defined by the H.264 standard.

9. The system of claim 8, wherein the encoding mode is an intra mode.

10. The system of claim 6, wherein the RD cost is defined as the distortion level of the encoding mode plus a calculated rate for the encoding mode multiplied by the Lagrange multiplier.

11. A module for estimating spatial domain residual, in a transform domain, for an encoding mode, the module comprising:
a first interface on which a transformed motion compensated prediction residual is received;
a second interface on which a reconstructed transform domain residual is received; and
a processor that generates an estimated spatial domain residual, in the transform domain, from the transformed motion compensated prediction residual and the reconstructed transform domain residual, the estimated spatial domain residual being used to calculate a distortion level for an encoding mode;
wherein the distortion level is defined as the trace $((e-e_Q)(e-e_Q)^T)$, wherein e represents the motion compensated prediction residual, $e_Q$ represents the estimated spatial domain residual, and T represents a 4×4 integer transform approximate of a 4×4 cosine transform, and
wherein the estimated spatial domain reconstructed residual is defined as $$e - e_Q = \frac{1}{64}(T^{-1}A(T^T)^{-1}), \text{ where } A = 64 \times E - M_1 E_Q M_1,$$

wherein E represents the transformed residual, $E_Q$ represents the reconstructed transform domain residual, and $M_1$=diag(4,5,4,5).

12. The module of claim 11, wherein the mode is defined by the H.264 standard.

13. The module of claim 12, wherein the encoding mode is an intra mode.

* * * * *